US011429994B2

(12) United States Patent
Kumaresan Nair et al.

(10) Patent No.: US 11,429,994 B2
(45) Date of Patent: Aug. 30, 2022

(54) COMMISSION FEES ADJUSTMENT SYSTEM

(71) Applicant: eBay Inc., San Jose, CA (US)

(72) Inventors: Satheesh Kumaresan Nair, Santa Clara, CA (US); Parin Pankaj Jogani, San Francisco, CA (US); Yoni Acriche, Austin, TX (US); Oded Deckelbaum, Herzliya (IL)

(73) Assignee: EBAY INC., San Jose, CA (US)

( * ) Notice: Subject to any disclaimer, the term of this patent is extended or adjusted under 35 U.S.C. 154(b) by 275 days.

(21) Appl. No.: 16/196,688

(22) Filed: Nov. 20, 2018

(65) Prior Publication Data

US 2020/0160367 A1 May 21, 2020

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0214* (2013.01); *G06Q 30/0611* (2013.01)

(58) Field of Classification Search
None
See application file for complete search history.

(56) References Cited

U.S. PATENT DOCUMENTS

| 6,415,264 B1 * | 7/2002 | Walker ............... G06Q 30/0217 705/26.35 |
| 6,873,968 B2 | 3/2005 | Ehrlich et al. |
| 7,860,780 B1 | 12/2010 | Cooper et al. |
| 8,041,611 B2 | 10/2011 | Kleinrock et al. |

(Continued)

FOREIGN PATENT DOCUMENTS

| CN | 110445755 A | * 11/2019 |
| KR | 101676065 B1 | * 11/2016 |

(Continued)

OTHER PUBLICATIONS

Katkar, Rama, and David H. Reiley. "Public versus secret reserve prices in eBay auctions: Results from a pokémon field experiment ." The BE Journal of Economic Analysis & Policy 5.2 (2007). (Year: 2007).*

(Continued)

*Primary Examiner* — Michael Bekerman
(74) *Attorney, Agent, or Firm* — Schwegman Lundberg & Woessner, P.A.

(57) ABSTRACT

Methods, systems, and devices for providing automatic adjustment to commission fees on a network-based marketplace. Consistent with some embodiments, a purchase offer for an item for sale is received via a user interface of a client device, the purchase offer including an offer price. Upon determining that the offer price is below a listed price, a commission fee reduction value is computed based on a difference between the listed price and the offer price. A reduced commission fee is determined based on the commission fee reduction value and a standard commission fee. Upon determining that the reduced commission fee satisfies a condition defined by a set of rules, a transaction for the sale of the item is automatically completed based on the reduced commission fee, the completing of the transaction comprising reducing the listed price by the commission fee reduction value.

18 Claims, 16 Drawing Sheets

(56) References Cited

U.S. PATENT DOCUMENTS

| | | | |
|---|---|---|---|
| 8,315,919 B1 | 11/2012 | Perrochon et al. | |
| 2002/0178071 A1* | 11/2002 | Walker | G06Q 20/401 |
| | | | 705/26.41 |
| 2003/0033205 A1* | 2/2003 | Nowers | G06Q 30/06 |
| | | | 705/26.8 |
| 2003/0110063 A1* | 6/2003 | Among | G06Q 30/02 |
| | | | 705/6 |
| 2004/0010452 A1* | 1/2004 | LaCour | G06Q 30/0613 |
| | | | 705/26.41 |
| 2004/0044611 A1* | 3/2004 | Heppenstall, Jr. | G06Q 40/04 |
| | | | 705/37 |
| 2005/0010457 A1* | 1/2005 | Ettinger, Jr. | G06Q 10/087 |
| | | | 705/7.35 |
| 2005/0149419 A1* | 7/2005 | Blumberg | G06Q 30/0274 |
| | | | 705/35 |
| 2005/0289046 A1* | 12/2005 | Conyack, Jr. | G06Q 40/02 |
| | | | 705/38 |
| 2006/0173773 A1 | 8/2006 | Ettinger, Jr. | |
| 2007/0055568 A1 | 3/2007 | Osborne | |
| 2007/0299736 A1 | 12/2007 | Perrochon et al. | |
| 2009/0012845 A1* | 1/2009 | Finley | G07F 17/40 |
| | | | 705/14.1 |
| 2009/0030848 A1* | 1/2009 | Wendel | G06Q 50/188 |
| | | | 705/26.1 |
| 2009/0048980 A1* | 2/2009 | Hubsher | G06Q 50/18 |
| | | | 705/80 |
| 2009/0276362 A1* | 11/2009 | Guerra | G06Q 50/188 |
| | | | 705/80 |
| 2009/0299820 A1* | 12/2009 | Wang | G06Q 30/0275 |
| | | | 705/14.71 |
| 2010/0138349 A1 | 6/2010 | Peng | |
| 2010/0241575 A1* | 9/2010 | Cotton | G06Q 30/0603 |
| | | | 705/80 |
| 2011/0264589 A1* | 10/2011 | Weiss | G06Q 50/188 |
| | | | 705/37 |
| 2012/0089454 A1* | 4/2012 | Chen | G06Q 30/0201 |
| | | | 705/14.42 |
| 2013/0238411 A1* | 9/2013 | Smith | G06Q 20/3276 |
| | | | 705/14.16 |
| 2014/0095395 A1* | 4/2014 | Romney | G06Q 50/188 |
| | | | 705/80 |
| 2014/0114792 A1* | 4/2014 | Smith | G06Q 30/06 |
| | | | 705/26.4 |
| 2014/0129365 A1* | 5/2014 | Harris | G06Q 30/08 |
| | | | 705/26.3 |
| 2014/0156353 A1 | 6/2014 | Urbanski et al. | |
| 2014/0207550 A1* | 7/2014 | Eden | G06Q 20/22 |
| | | | 705/14.23 |
| 2015/0051997 A1* | 2/2015 | Taoussanopoulos | G06Q 30/08 |
| | | | 705/26.3 |
| 2015/0348169 A1 | 12/2015 | Harris et al. | |
| 2017/0046732 A1 | 2/2017 | Elmachtoub et al. | |
| 2017/0262914 A1* | 9/2017 | Okoro | G06Q 30/0633 |
| 2020/0034754 A1* | 1/2020 | Fortini | G06Q 30/0641 |

FOREIGN PATENT DOCUMENTS

| | | | | |
|---|---|---|---|---|
| KR | 10-2018-0031452 A | 3/2018 | | |
| WO | 2001/033464 A1 | 5/2001 | | |
| WO | WO-2009121191 A1 * | 10/2009 | | G06Q 30/06 |
| WO | 2013/134791 A1 | 9/2013 | | |
| WO | WO-2014047215 A1 * | 3/2014 | | G06Q 30/0214 |
| WO | 2016/022436 A1 | 2/2016 | | |
| WO | WO-2016022436 A1 * | 2/2016 | | G06Q 30/0601 |
| WO | 2020/106325 A1 | 5/2020 | | |
| WO | 2020/106325 A8 | 7/2020 | | |

OTHER PUBLICATIONS

International Search Report received for PCT Application No. PCT/US2019/040449, dated Nov. 15, 2019, 3 pages.

International Written Opinion received for PCT Application No. PCT/US2019/040449, dated Nov. 15, 2019, 7 pages.

International Preliminary Report on Patentability Received for PCT Patent Application No. PCT/US2019/040449, dated Jun. 3, 2021, 9 Pages.

* cited by examiner

*FIG. 10C*

COMMISSION FEES ADJUSTMENT SYSTEM

TECHNICAL FIELD

The subject matter of the present disclosure generally relates to systems, methods, and devices for providing an improved user interface supporting a network-based marketplace. Specifically, in some example embodiments, the present disclosure addresses systems, methods, and devices for providing an improved user interface that facilitates an automatic adjustment of a commission fee of the network-based marketplace.

BACKGROUND

Network-based marketplaces enjoy widespread use. Such marketplaces may comprise formats that include simple classified ads and bulletin boards, to more advanced systems which facilitate auction format listings. Conventional user interfaces that support network-based marketplaces enable various models for transactions conducted through such marketplaces include fixed price, peer-to-peer bidding, volume purchasing, and bid and lock models. These models, as well as others, have been in use for many years and have been widely successful.

While conventional user interfaces that support network-based marketplaces provide significant advantages and benefits over traditional marketplaces, there remain a number of limitations. In particular, when a potential buyer makes an offer at an offer price that is below a listed price, the transaction cannot be completed without further user interactions with the potential buyer and/or seller to adjust the offer price and/or the listed price. For example, conventional network-based marketplace user interfaces typically require the seller to interact with the user interface to reduce the listed price to match the offer price and/or the potential buyer to interact with the user interface to increase the offer price to match the listed price.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

FIGS. 10A, 10B, 10C and 10D are interface diagrams illustrating example interfaces presented by a network-based marketplace, according to example embodiments.

DETAILED DESCRIPTION

Figure 1:
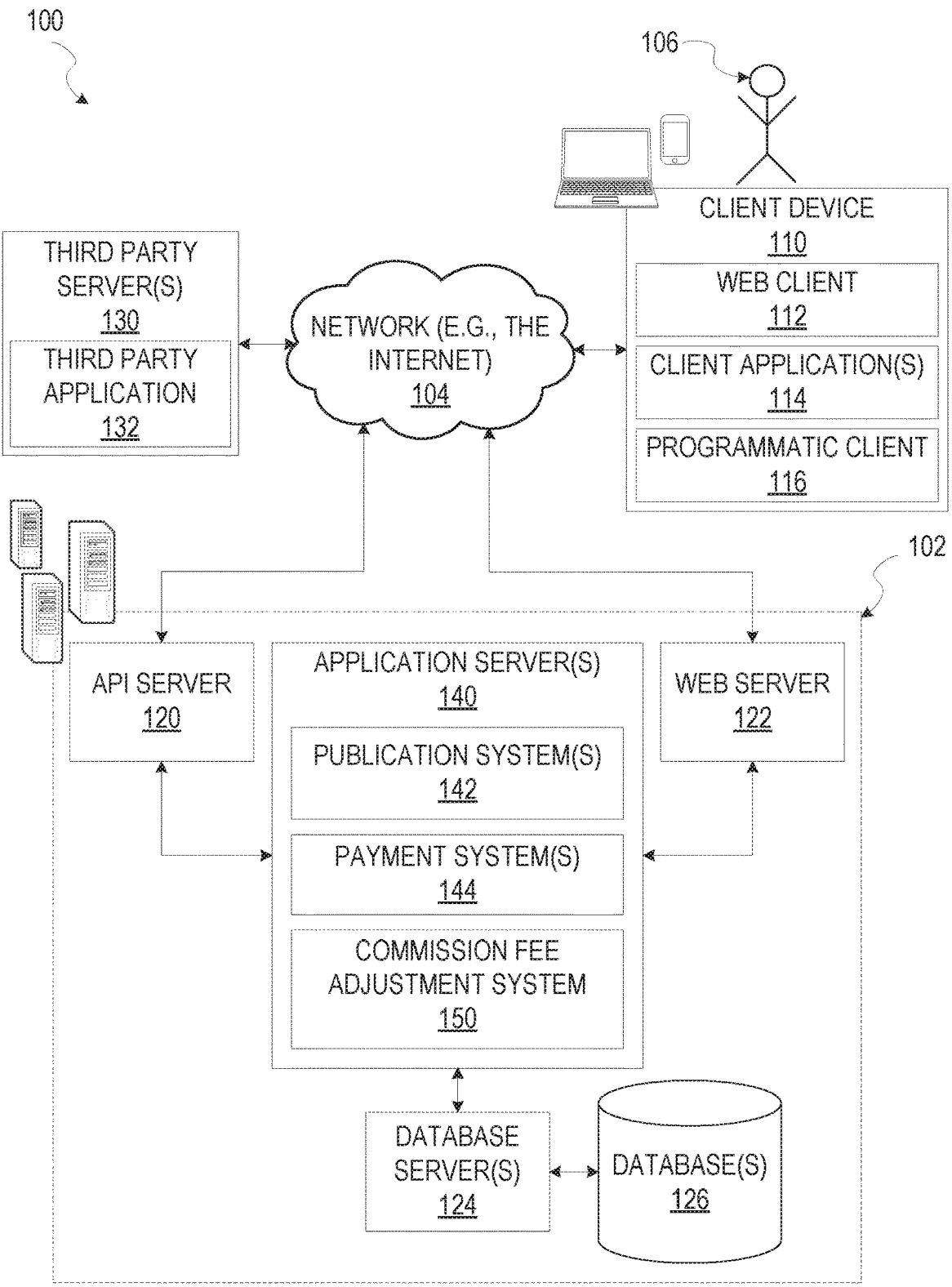
FIG. 1 is a block diagram illustrating a network-based marketplace, according to some example embodiments.

Example methods, systems, and devices are directed to providing an improved user interface that facilitate the completion of transactions in a network-based marketplace by supporting automatic adjustment of a commission fee of the network-based marketplace. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As noted above, conventional user interfaces supporting network-based marketplaces do not provide functionality that enables the completion of a transaction when a potential buyer makes an offer at an offer price that is below a listed price, without further user interactions with the buyer and/or seller to adjust the offer price and/or the listed price. These conventional user interfaces typically require the seller to interact with the user interface to reduce the listed price to match the offer price and/or the potential buyer to interact with the user interface to increase the offer price to match the listed price. Aspects of the present disclosure address the above referenced issues among others with methods, systems, and devices configured to adjust the commission fee of the network-based marketplace for the sale of an item and automatically complete a transaction for the sale of the item based on the reduced commission fee through the network-based marketplace.

"Automatically" completing a transaction for the sale of the item means that the transaction for the sale of the item is completed without requiring further user interaction from the seller. Aspects of the present disclosure therefore provides an improved user interface facilitating transactions in a network-based marketplace by reducing the number of interactions required from the seller to complete a transaction, even when the buyer makes an offer at an offer price that is below a listed price. According to some embodiments, "automatically" completing a transaction for the sale of the item means that the transaction for the sale of the item is completed without requiring further user interaction from either the seller or the buyer. Aspects of the present disclosure therefore provide an improved user interface for facilitating transactions in a network-based marketplace by reducing the number of interactions required from the seller and the buyer to complete a transaction, even when the buyer makes an offer at an offer price that is below a listed price. Aspects of the present disclosure therefore provides specific improvement over prior systems resulting in an improved user interface for electronic devices.

Consistent with some embodiments, a purchase offer for an item for sale is received, at a server of the network-based marketplace, via a user interface of a client device, the purchase offer including an offer price. Based on determining the offer price is below a listed price, a commission fee reduction value is computed based on a difference between the listed price and the offer price. A reduced commission fee is determined based on the commission fee reduction value and a standard commission fee. Based on determining that the reduced commission fee satisfies a condition defined by a set of rules, a transaction for the sale of the item is automatically completed based on the reduced commission fee, the completing of the transaction comprising reducing the listed price by the commission fee reduction value.

With reference to FIG. 1, an example embodiment of a network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser), an application 114, and a programmatic client 116 executing on client device 110.

The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

A user 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application programming interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repository or database 126. In an example embodiment, the databases 126 are storage devices that store information to be posted (e.g., publications or listings) to the publication system 142. The databases 126 may also store data regarding users 106, in particular user profile data.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The commission fee adjustment system 150 may provide functionality operable to instantly adjust commission fees for a transaction based on an incoming offer from a potential buyer. The commission fee adjustment system 150 may access data from the databases 126, the third party servers 130, the publication system 142, and other sources. In some example embodiments, the commission fee adjustment system 150 may communicate with the publication systems 142 (e.g., for accessing item listings) and payment system 144 (e.g., by instructing the payment system 144 to complete a transaction). In an alternative embodiment, the commission fee adjustment system 150 may be a part of the publication system 144.

While the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and commission fee adjustment system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application to enable sellers to author and manage listings on the networked system 102 in an off-line manner, and to perform batch-mode communications between the programmatic client 116 and the networked system 102.

Figure 2:
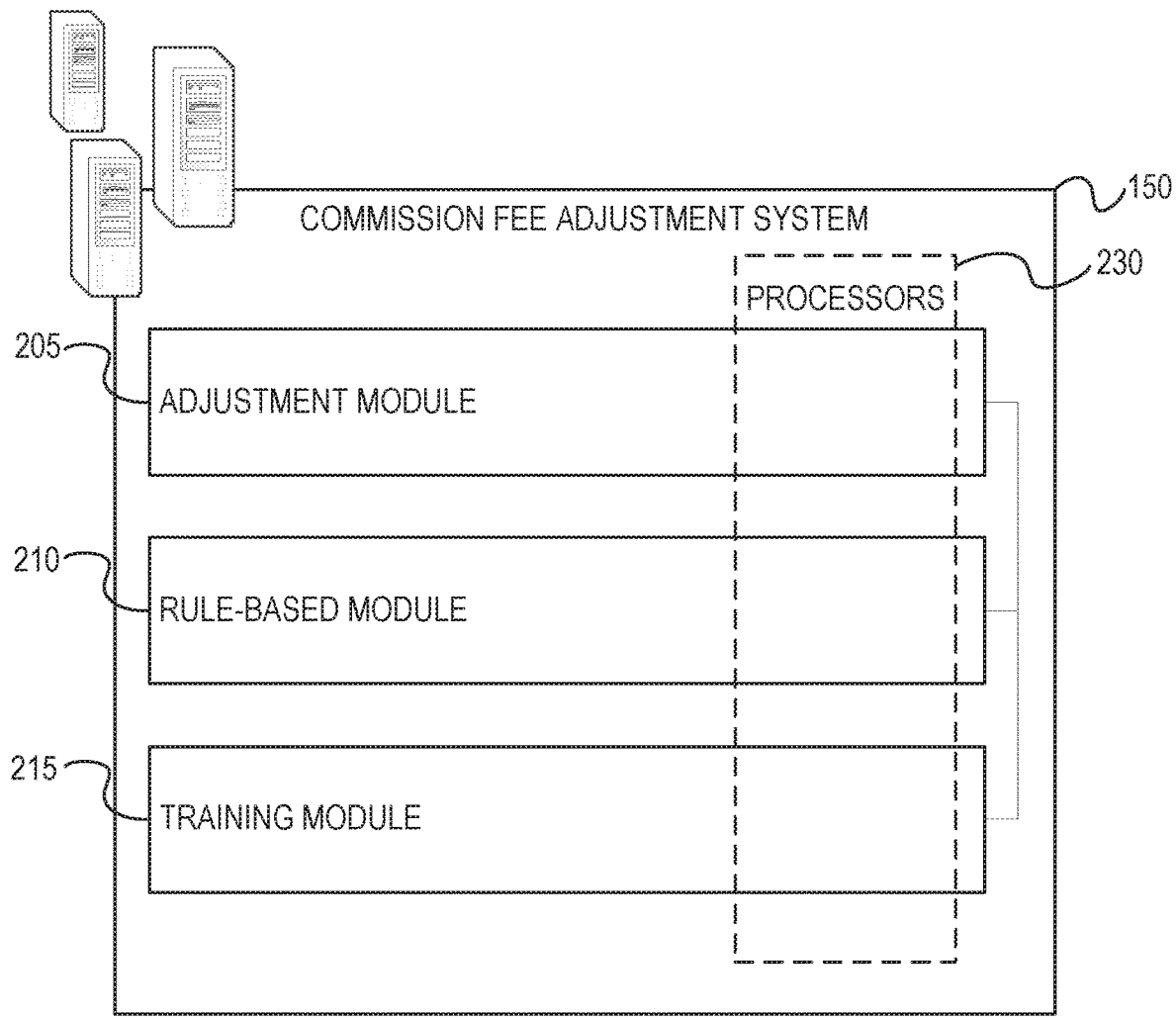
FIG. 2 is a block diagram illustrating various functional components of a commission fee adjustment system, which is provided as part of the network-based marketplace, according to example embodiments.

FIG. 2 is a block diagram illustrating components of a commission fee adjustment system 150 that provide functionality for instantly adjusting commission fees, according to some example embodiments. The commission fee adjustment system 150 is show as including an adjustment module 205, a rule-based module 210, and a training module 215, all configured to communicate with each other (e.g., via a bus, shared memory, or a switch). Any one or more of these modules may be implemented using one or more processors 230 (e.g., by configuring such one or more processors to perform functions described for that module) and hence may include one or more of the processors 230.

Any one or more of the modules described may be implemented using dedicated hardware alone (e.g., one or more of the processors 230 of a machine) or a combination of hardware and software. For example, any module described of the commission fee adjustment system 150 may physically include an arrangement of one or more of the processors 230 (e.g., a subset of or among the one or more processors of the machine) configured to perform the operations described herein for that module. As another example, any module of the commission fee adjustment system 150 may include software, hardware, or both, that configure an arrangement of one or more processors 230 (e.g., among the one or more processors of the machine) to perform the operations described herein for that module. Accordingly, different modules of commission fee adjustment system 150 may include and configure different arrangements of such processors 230 or a single arrangement of such processors 230 at different points in time. Moreover, any two or more modules of the commission fee adjustment system 150 may be combined into a single module, and the functions described herein for a single module may be subdivided among multiple modules. Furthermore, according to various example embodiments, modules described herein as being implemented within a single machine, database, or device may be distributed across multiple machines, databases, or devices. Further details regarding the functionality of each of the modules illustrated in FIG. 2 are discussed below in reference to FIGS. 3-8.

Figure 3:
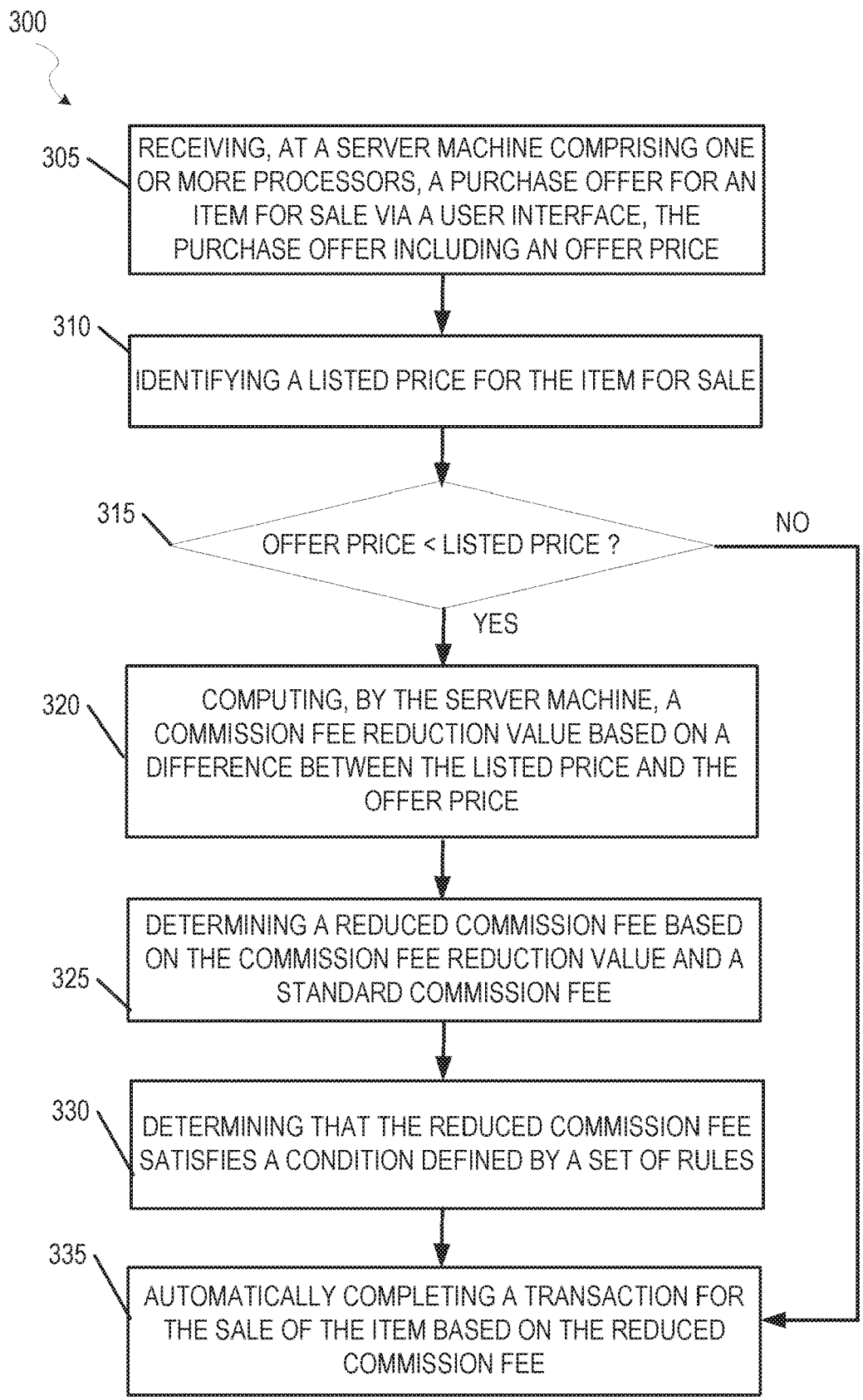
FIGS. 3-7 are flowcharts illustrating methods for generating and presenting various interfaces to facilitate the completion of a transaction within a network-based marketplace, according to example embodiments.

FIG. 3 is a flowchart illustrating a method 300 for generating and presenting various interfaces to automatically complete a transaction for a sale of an item based on a reduced commission fee within a networked marketplace, according to an example embodiment. The method 300 may be embodied in computer-readable instructions for execution by one or more processors (e.g., processors 230 of FIG. 2) such that the steps of the method 300 may be performed in part or in whole by functional components (e.g., modules) of a publication system 142, a commission fee adjustment system 150, and a payment system 144; accordingly, the method 300 is described below by way of example with reference thereto. However, it shall be appreciated that the method 300 may be deployed on various other hardware configurations and is not intended to be limited to the functional components of the publication system 142, commission fee adjustment system 150, and payment system 144.

At operation 305, the publication system 140 receives, from the potential buyer, via an interface of the client device, a purchase offer for an item for sale. The purchase offer including an offer price. As described in reference to FIG. 10A, the purchase offer may be received as an input entered in an editable input field for entering an offer price displayed on the user interface of the client device. The editable input field for entering the offer price may be displayed as part of an item listing for the item for sale, an in particular alongside a listed price for the item listing. For example, a potential buyer (e.g., user 106) may browse or search for the item via a search interface of a client device (e.g., client device 110). In response to the browsing or searching activity, the publication system 140 identifies an item listing corresponding to the item, and causes display, on the user interface of the client device, of an interface including the item listing, the item listing including the editable input field for entering the offer price.

At operation 310, the commission fee adjustment system 150 identifies a listed price for the item for sale. For example, if the offer price had been received via an editable input field displayed as part of an item listing, the commission fee adjustment system 150 would identify the listed price of that particular item listing as the listed price for the item for sale. The listed price may be equal to a base price plus a standard commission fee.

At operation 315, the commission fee adjustment system 150 accesses the offer price and the listed price and determines whether the offer price is below the listed price of the item.

If the offer price is equal to (or higher than) the listed price, the commission fee adjustment system 150 causes the payment system 144 to automatically complete a transaction for the sale of the item based on a standard commission fee (at operation 335).

If the offer price is below the listed price, the commission fee adjustment system 150 (e.g., the adjustment module 205) computes, at operation 320, a commission fee reduction value based on a difference between the listed price and the offer price. In particular, the commission fee reduction value can be the difference between the listed price and the offer price.

At operation 325, the commission fee adjustment system 150 (e.g., the adjustment module 205) determines a reduced commission fee based on the commission fee reduction value and the standard commission fee. For example, the reduced commission fee may be computed by subtracting the commission fee reduction from the standard commission fee.

At operation 330, the commission fee adjustment system 150 (e.g., the rule-based module 210) determines whether the reduced commission fee satisfies a condition defined by a set of rules. The condition defined by the set of rules may be that the reduced commission fee surpasses a threshold commission fee. The threshold commission fee may, for example, be computed based on a minimum profitability level for the network-based marketplace. The commission fee reduction can be funded from different sources, not just from the marketplace's commission fee for the item for sale. For example, the commission fee reduction could be funded as part of a marketing or growth campaign. Therefore, in some embodiments, the threshold commission fee may be negative. As described in reference to FIG. 4, the set of rules may also specify boundary conditions based on user profile data of the potential buyer. As described in reference to FIG. 5, the set of rules may also specify boundary conditions based on a listed price of one or more other listings for identical or similar items for sale published on another network-based marketplace. As described in reference to FIG. 6, the set of rules can also be identified by training a model on a learning problem formulated as a maximization of a performance indicator of the network-based marketplace.

If the reduced commission fee is determined to satisfy the condition defined by the set of rules, the commission fee adjustment system 150 instructs, at operation 335, the payment system 144 to automatically complete a transaction for the sale of the item based on the reduced commission fee. The completing of the transaction comprises reducing the listed price by the commission fee reduction value. As described in reference to FIG. 10B, in some embodiments, the commission fee adjustment system 150 causes display, on the user interface of the client device, of an updated listed price, the updated listed price is equal to the listed price reduced by the commission fee reduction value.

Figure 4:
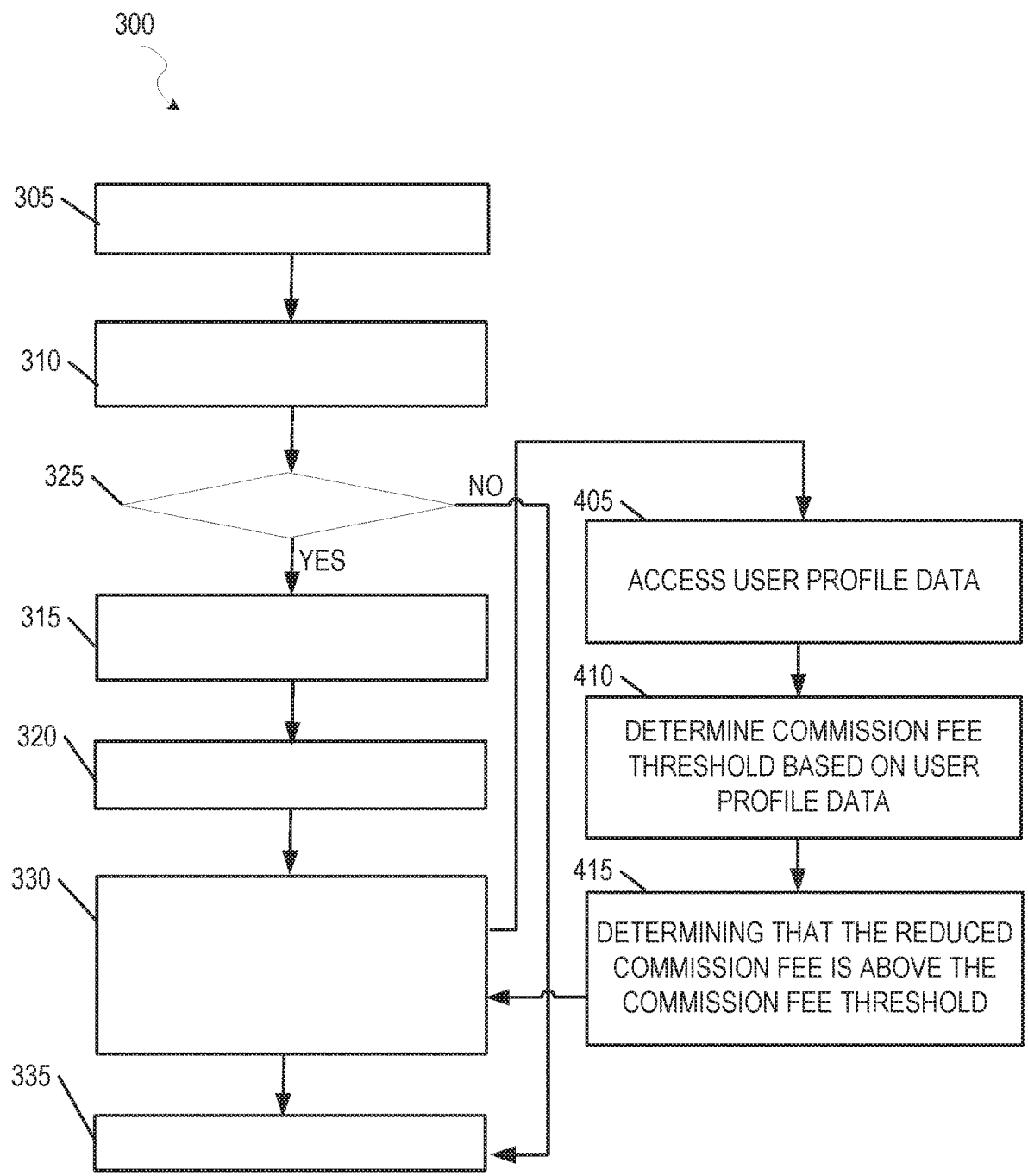

As shown in FIG. 4 the method 300 may, in some embodiments, include operations 405, 410 and 415, according to some embodiments. Consistent with some embodiments, the operations 405, 410 and 415 may be performed as part of (e.g., as sub-operations or as a subroutine) operation 330, where the commission fee adjustment system 150 determines whether the reduced commission fee satisfies a condition defined by a set of rules.

At operation 405, the commission fee adjustment system 150 accesses user profile data associated with the potential buyer. The user profile data includes information that describes user purchase history of the potential buyer. As an example, the user purchase history may include a total amount spent by the potential buyer on the network-based marketplace, a loyalty score of the potential buyer, and how long the potential buyer has been active on the network-based marketplace whether the potential buyer is a new or a return buyer). The user profile data may further include an estimated life time value of the potential buyer.

At operation 410, the commission fee adjustment system 150 determines the threshold commission fee based on the user profile data of the potential buyer. For example, the threshold commission fee can be lower if the estimated life time value of the user is high, or if the total amount spent by the potential buyer on the network-based marketplace is high, or if the loyalty score of the potential buyer is high, or if the potential buyer has been active on the network-based marketplace for a long time.

At operation 415, the commission fee adjustment system 150 determines whether the reduced commission fee surpasses the threshold commission fee determined, at operation 410, based on the user profile data of the potential buyer.

Figure 5:
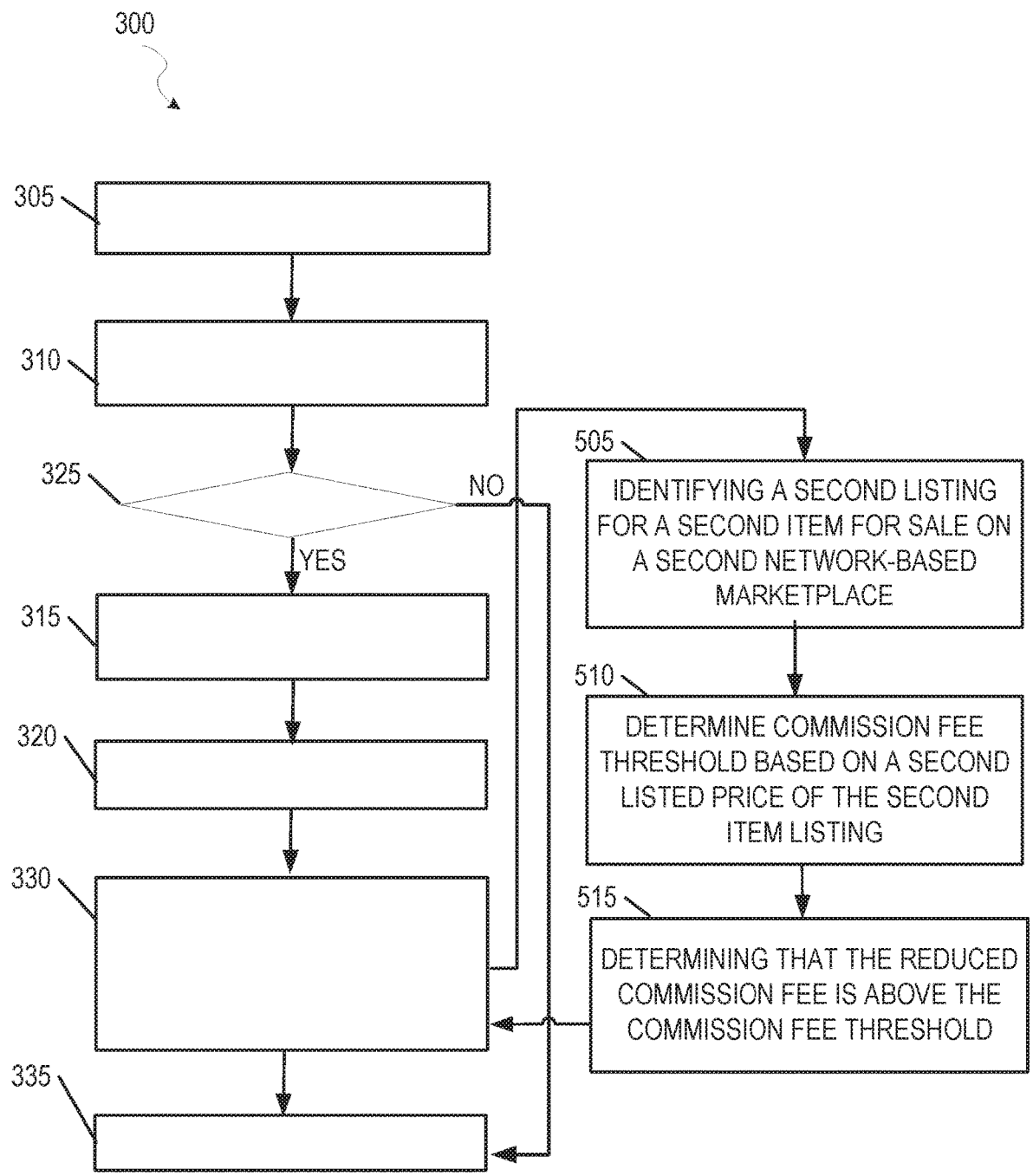

As shown in FIG. 5, the method 300 may include operations 505, 510 and 515, according to some embodiments. Consistent with some embodiments, the operations 505, 510 and 515 may be performed as part of (e.g., as sub-operations or as a subroutine) operation 330, where the commission fee adjustment system 150 determines whether the reduced commission fee satisfies a condition defined by a set of rules.

At operation 505, the commission fee adjustment system 150 identifies a second item listing for a second item for sale on a second network-based marketplace. The second item is similar or identical to the item for sale for which the purchase offer was received at operation 305 (hereinafter called the first item for sale). The second listing may be identified based at least on an item attribute of the second item matching an item attribute of the first item. The second item listing includes a second listed price.

At operation 510, the commission fee adjustment system 150 determines the threshold commission fee based on a second listed price of the second item listing. In particular, the threshold commission fee can be computed based on a difference between the listed price of the first item for sale (hereinafter called the first listed price) and the second listed price. If more than one second item listings have been identified at operation 505, the threshold commission fee may be based on the listed price of the second item listing having the lowest listed price.

At operation 515, the commission fee adjustment system 150 determines whether the reduced commission fee surpasses the threshold commission fee determined, at operation 510, based on the second listed price.

Figure 6:
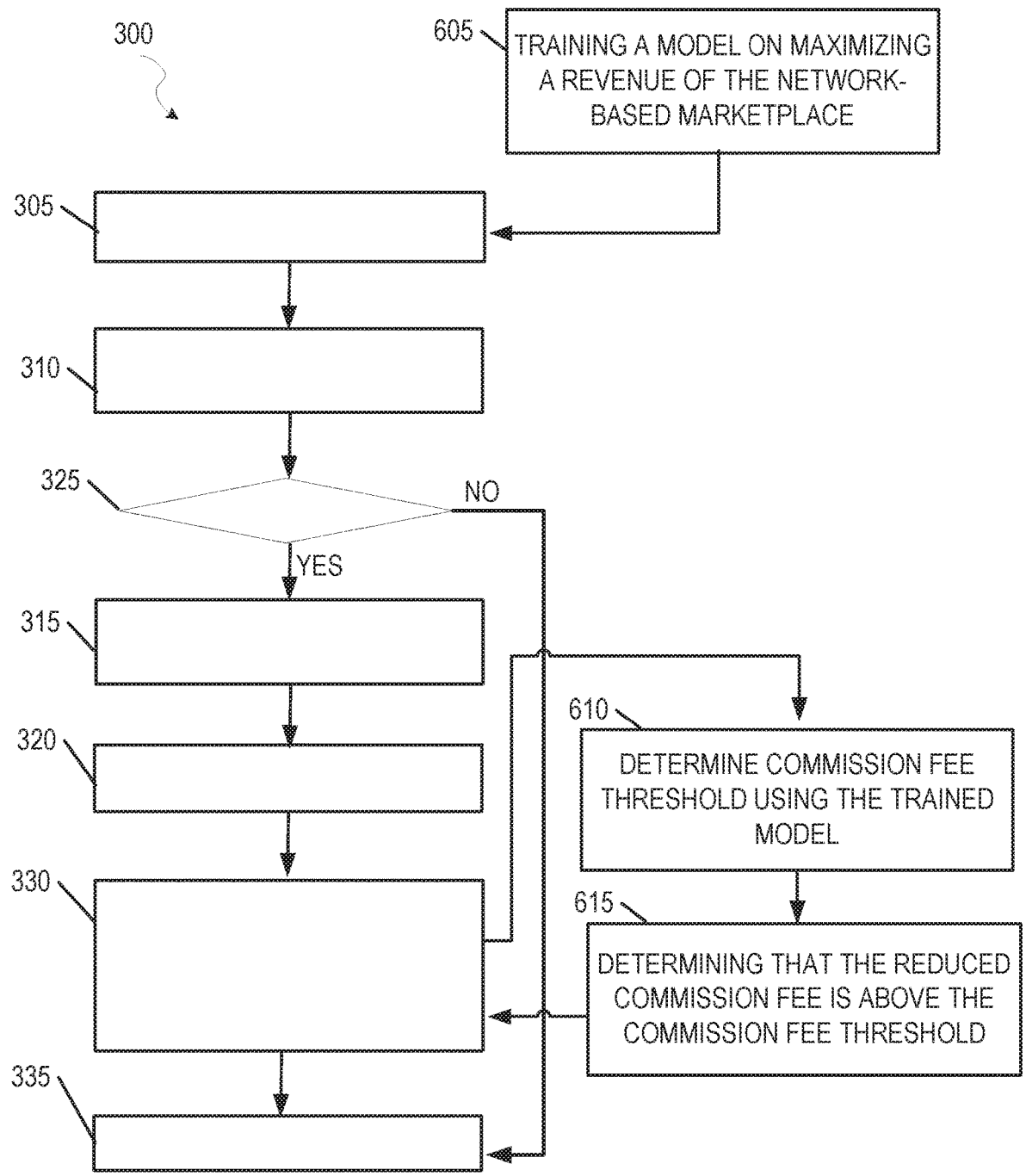

As shown in FIG. 6, the method 300 may, in some embodiments, further include operations 605, 610 and 615. Consistent with some embodiments, operation 605 may be performed before operation 305, where the publication system 140 receives a purchase offer for the item for sale. Consistent with some embodiments, operations 610 and 615 may be performed as part of (e.g., as sub-operations or as a subroutine) operation 330, where the commission fee adjustment system 150 determines whether the reduced commission fee satisfies a condition defined by a set of rules. Consistent with some embodiments, operation 605 may be performed in part or in whole by a training module 215 of a commission fee adjustment system 150. Consistent with some embodiments, operations 610, and 615 may be performed in part or in whole by a rule-based module 210 of a commission fee adjustment system 150

At operation 605, the training module 215 trains a model on a learning problem formulated as a maximization of one or more performance indicator of the network-based marketplace. The demand model can use machine learning and/or statistical methods to maximize the one or more performance indicator of the network-based marketplace. The performance indicators can be financial indicators like a revenue, a profit, or commercial indicators like a seller utility or a buyer utility. The model can be trained on a training set including historical data regarding listed prices of item listings published on the network-based marketplace, offer prices received at the network-based marketplace, and/or listed prices of items listings published on another network-based market places, and/or historical revenues of the network-based marketplace. In particular, the training set can include a set of training examples, each training example including at least a listed price and an offer price. The training module 215 trains the model to output, for each example of the set of training examples, the value of the threshold commission fee maximizing the performance indicator of the network-based marketplace.

At operation 610, the rule-based module 210 determines the threshold commission fee using the trained model. In particular, the rule-based module 210 implements the trained model and inputs the first listed price and the offer price into the trained model, so that the trained model outputs the value of the threshold commission fee that is predicted to maximize the performance indicator of the network-based marketplace. The model can take additional data as input, including user profile data of the potential buyer (as described in reference to FIG. 4), and/or listed price of item listings published by other network-based marketplaces (as described in reference to FIG. 5).

At operation 615, the commission fee adjustment system 650 determines whether the reduced commission fee surpasses the threshold commission fee determined, at operation 610, using the trained model.

Figure 7:
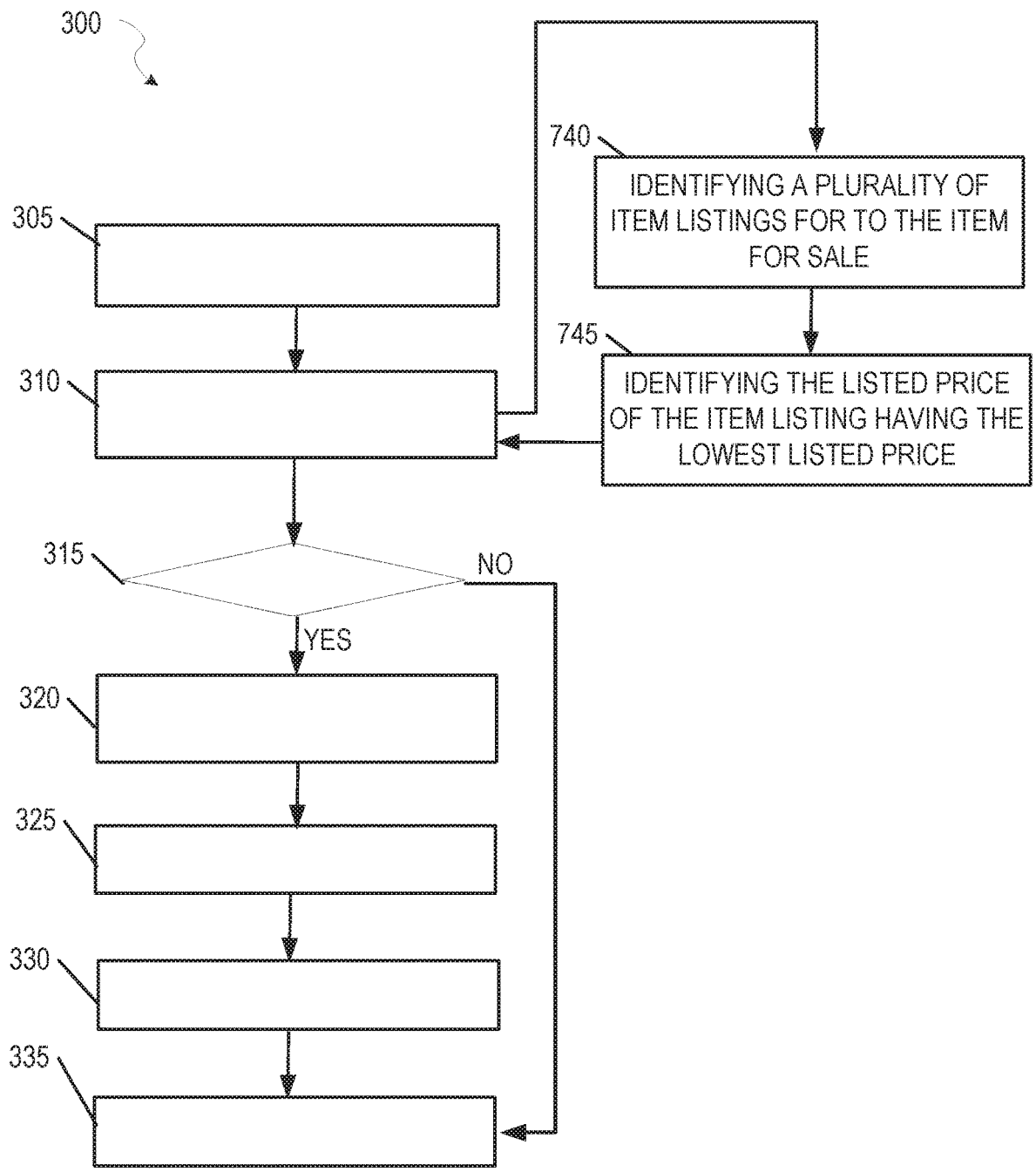

As shown in FIG. 7, the method 300 may, in some embodiments, include operations 740 and 745, according to some embodiments. Consistent with some embodiments, operations 740 and 745 may be performed as part of (e.g., as sub-operations or as a subroutine) of operation 310, where the commission fee adjustment system 150 identifies a listed price for the item for sale.

At operation 740, the commission fee adjustment system 150 identifies a plurality of item listings for the item for sale, each item listing including a respective listed price.

At operation 745, the commission fee adjustment system 150 identifies the listed price of the item listing having the lowest listed price among the plurality of item listings identified at operation 740.

In the embodiments including operations 740 and 745, at operations 315-335, the listed price is the lowest listed price (which is not necessarily the listed price of the item listing for which the buyer initially made an offer), and the item listing is the item listing identified as having the lowest listed price (which is not necessarily the item listing for which the buyer initially made an offer). In particular, at operation 335, the transaction is completed based on the item listing identified as having the lowest listed price. Moreover, in embodiments wherein the commission fee adjustment system 150 causes display of an updated listed price, only the listed price of the item listing identified as having the lowest listed price is updated.

Figure 8A:
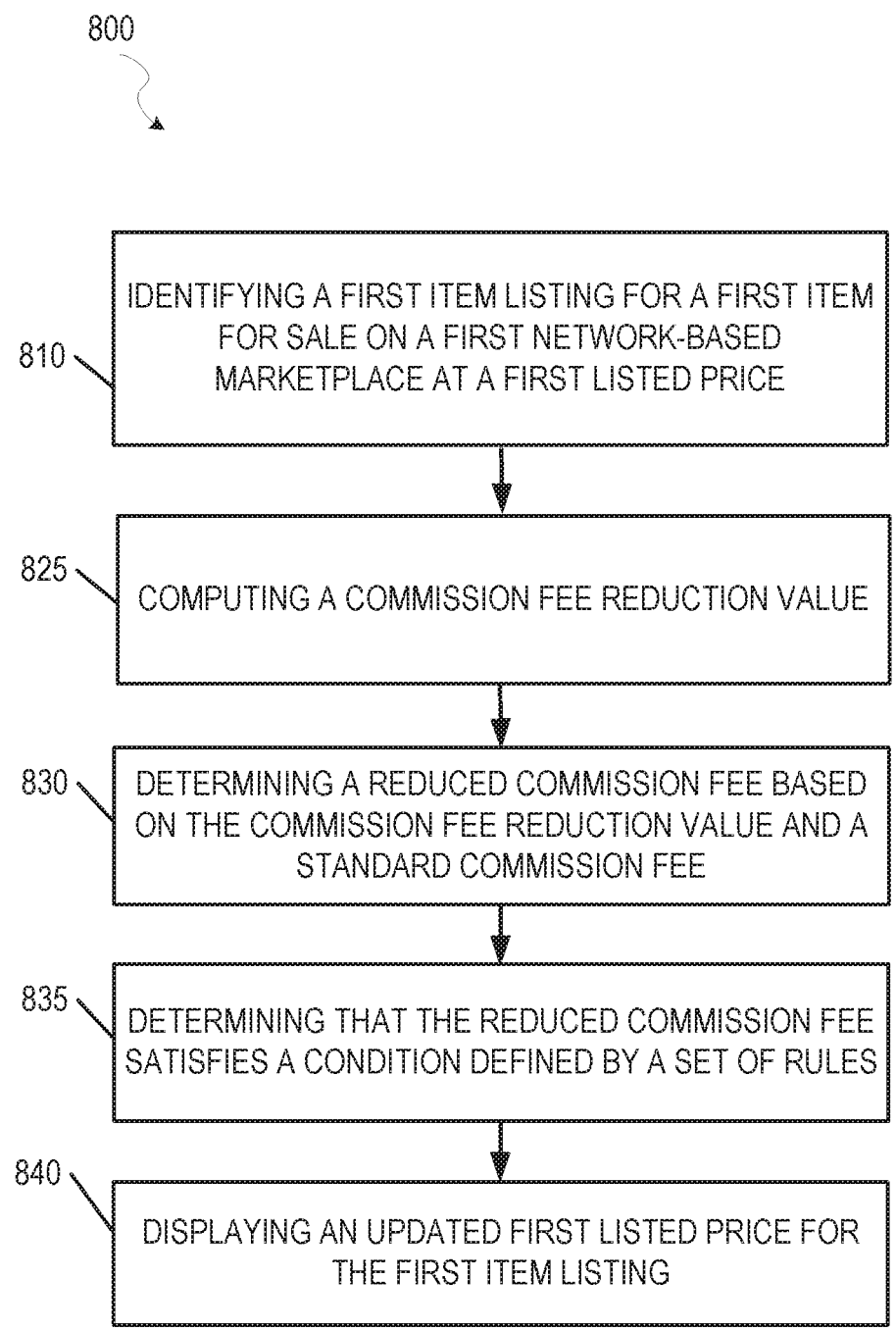
FIGS. 8A, 8B and 8C are flowcharts illustrating methods for generating and presenting various interfaces to automatically update a listed price of an item listing based on a reduced commission fee within a networked marketplace, according to examples embodiments.

FIG. 8A is a flowchart illustrating a method 800 for generating and presenting various interfaces to automatically update a listed price of an item listing based on a reduced commission fee within a networked marketplace, according to an example embodiment. The method 800 may be embodied in computer-readable instructions for execution by one or more processors (e.g., processors 230 of FIG. 2) such that the steps of the method 800 may be performed in part or in whole by functional components (e.g., modules) of a publication system 142, and a commission fee adjustment system 150; accordingly, the method 800 is described below by way of example with reference thereto. However, it shall be appreciated that the method 800 may be deployed on various other hardware configurations and is not intended to be limited to the functional components of the publication system 142, and commission fee adjustment system 150.

At operation 810, the publication system 140 identifies a first item listing for a first item for sale at a first network-based marketplace.

In some embodiments, the publication system 140 identifies the first item listing by detecting, via an interface of the client device, an interest of the potential buyer for an item listing. The interest may be explicit or implicit. An explicit interest may be detected based on explicit inputs received via the interface of the client device, such as a user interaction with an item listing. An implicit interest may be detected based on inputs that do not explicitly or expressly indicate an interest in the item listing based on the above-mentioned explicit inputs. For example, an implicit interest may be detected based on implicit user inputs that include searching for the item or viewing the item listing. The method 800 may be applied to the item listing for which the potential buyer expressed an interest. Alternatively, the method 800 may be applied to the item listing offering the lowest listed price for an item identical or similar to the item listing for which the potential buyer expressed an interest.

In some embodiments, the method 800 is applied to a new listing for an item for sale that has just been received or created at the first network-based marketplace to ensure that the new item listing is published with a listed price that is lower than the listed prices for similar or identical items offered at other network-based marketplaces. For example, as described in reference to FIG. 10C, the publication system 140 identifies a new listing that has just been received or created as the first item listing.

In some embodiments, the method 800 is regularly or randomly applied to listings published on the network-based marketplace to ensure that these item listings are published with a listed price that is lower than the listed prices for similar or identical items offered at other network-based marketplaces. For example, the publication system 140 identifies any item listing published on the first network-based marketplace as the first item listing.

In some embodiments, only the item listing having the lowest listed price is eligible for commission fee reduction. The method 800 is applied to the item listing having the lowest listed price among a plurality of item listings published on the first network-based marketplace for a particular item or category of items. In some embodiments, the publication system 140 identifies a plurality of item listings for similar or identical items that are published on the first network-based marketplace, each one of the item listings being associated to a listed price. The plurality of listings may be identified based on sharing one or more item attributes. The publication system 140 identifies the first item listing as the item listing having the lowest listed price among the plurality of item listings.

At operation 825, the commission fee adjustment system 150 (e.g., the adjustment module 205) computes a commission fee reduction value for the first item listing. As described in reference to FIG. 8B, the commission fee reduction value may be computed based on a listed price of at least one identical or similar item for sale on another network-based marketplace. As described in reference to FIG. 8C, the commission fee reduction value may be computed using a demand model.

At operation 830, the commission fee adjustment system 150 (e.g., the adjustment module 205) determines a reduced commission fee based on the commission fee reduction value and the standard commission fee. For example, the reduced commission fee may be computed by subtracting the commission fee reduction from the standard commission fee.

At operation 835, the commission fee adjustment system 150 (e.g., the rule-based module 210) determines whether the reduced commission fee satisfies a condition defined by a set of rules. The condition defined by the set of rules may be that the reduced commission fee surpasses a threshold commission fee. The threshold commission fee may, for example, be computed based on a minimum profitability level for the network-based marketplace. The commission fee reduction can be funded from different sources, not just from the network-based marketplace's commission fee for the first item for sale. For example, the commission fee reduction could be funded as part of a marketing or growth campaign. Therefore, in some embodiments, the threshold commission fee may be negative. As described in reference to FIG. 5, the set of rules may also specify boundary conditions based on a listed price of one or more other listings for identical or similar items for sale published on another network-based marketplace. As described in reference to FIG. 6, the set of rules can also be identified by training a model on a learning problem formulated as a maximization of a performance indicator of the network-based marketplace.

Figure 10A:
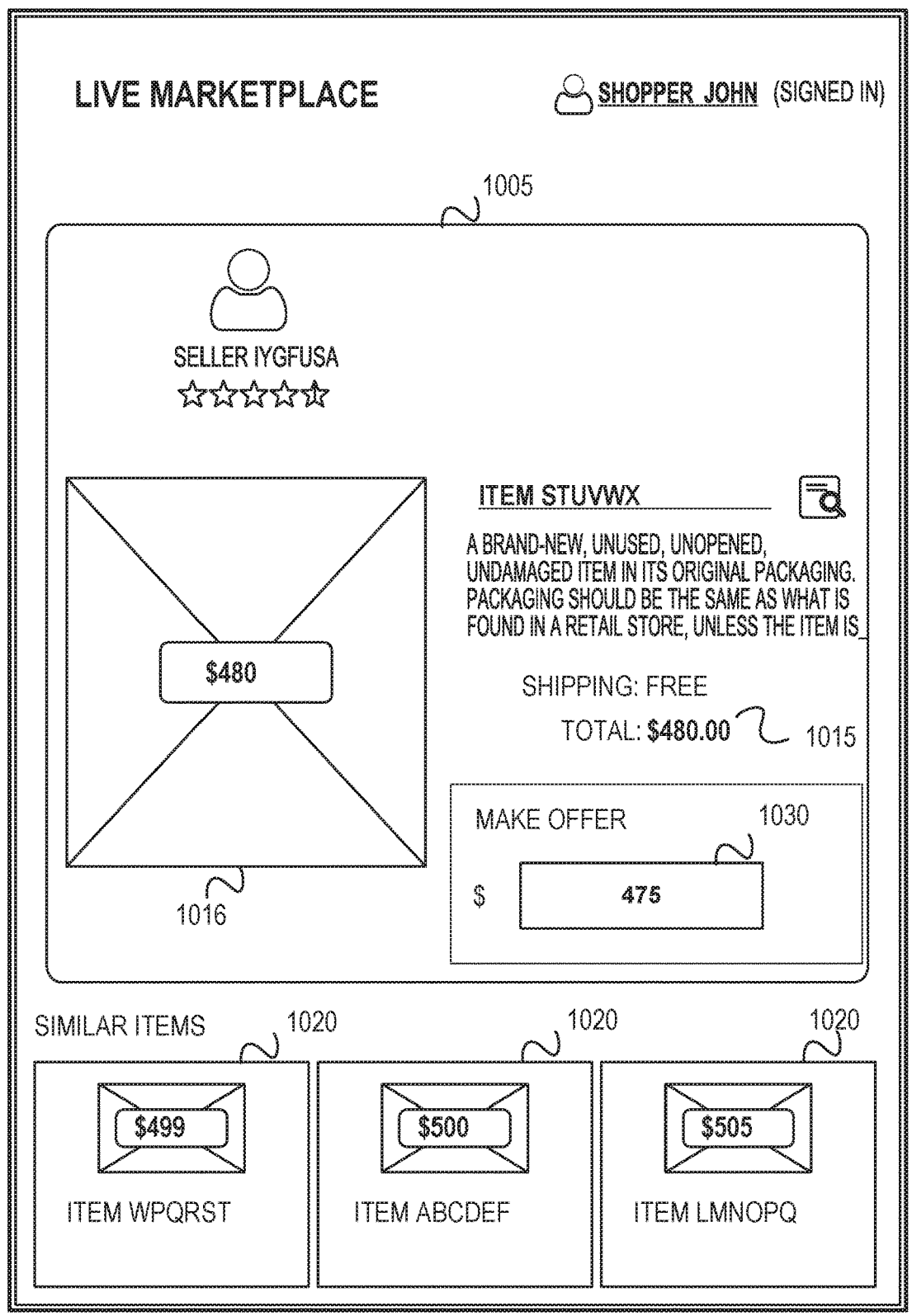
Figure 10B:
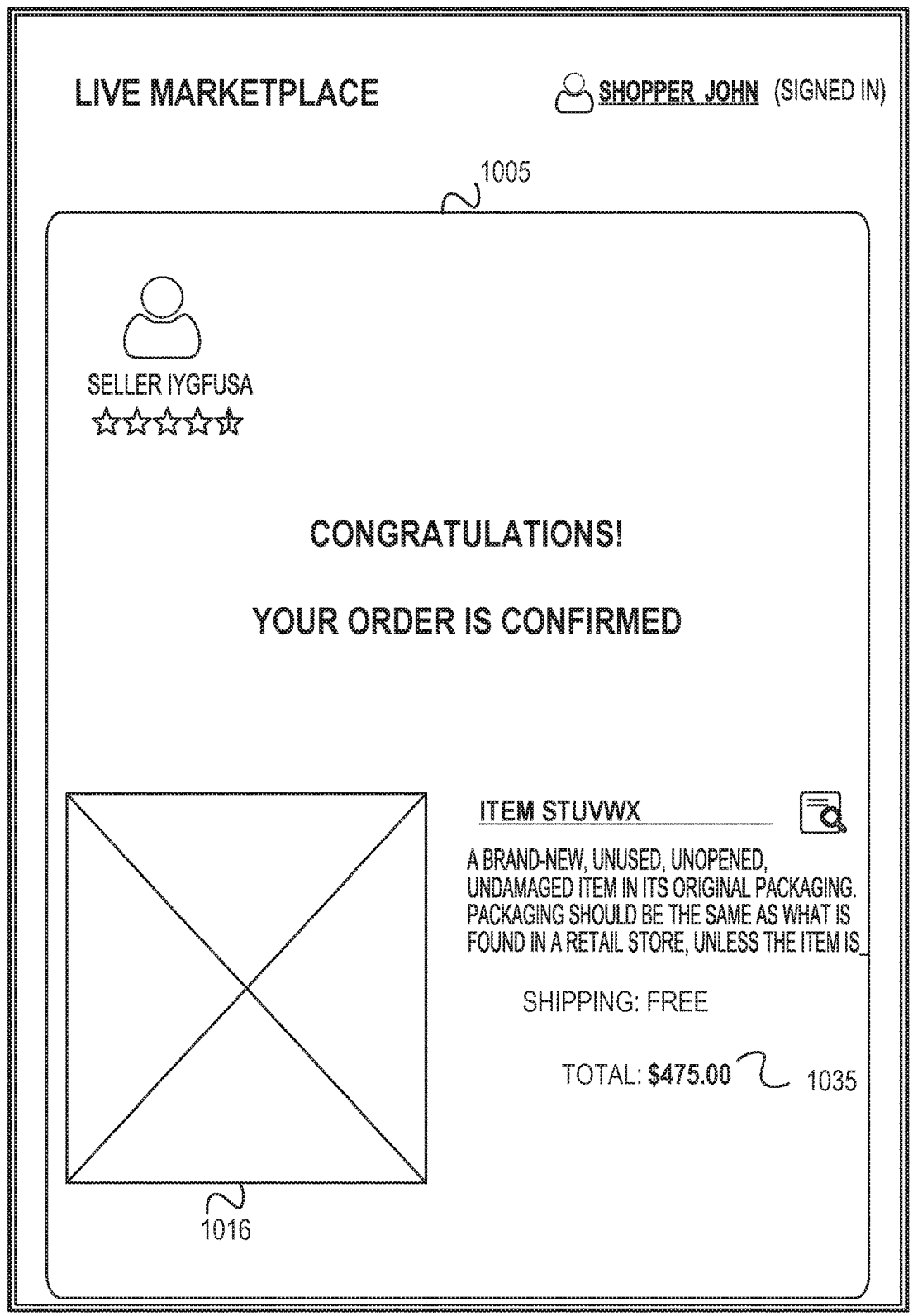
Figure 10C:
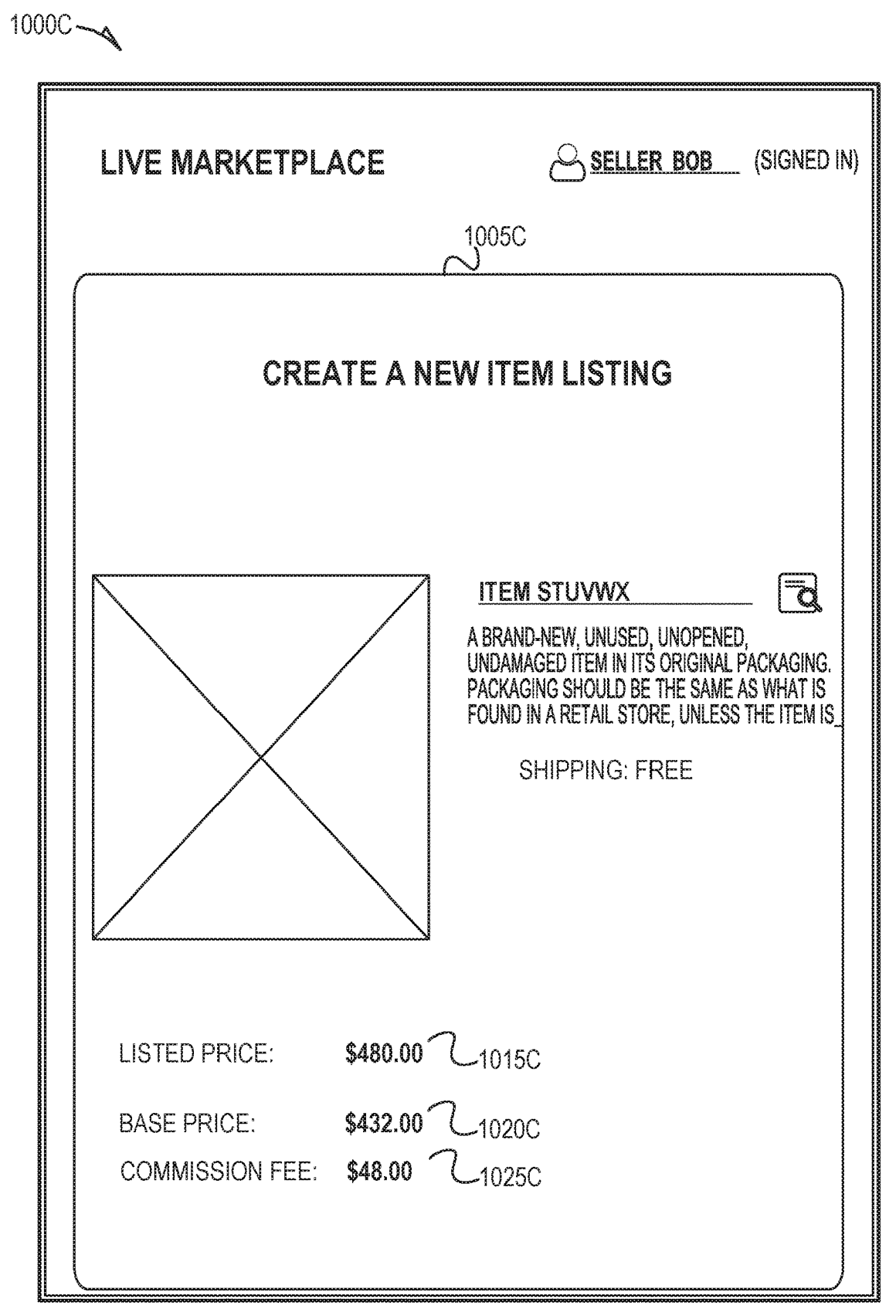
Figure 10D:
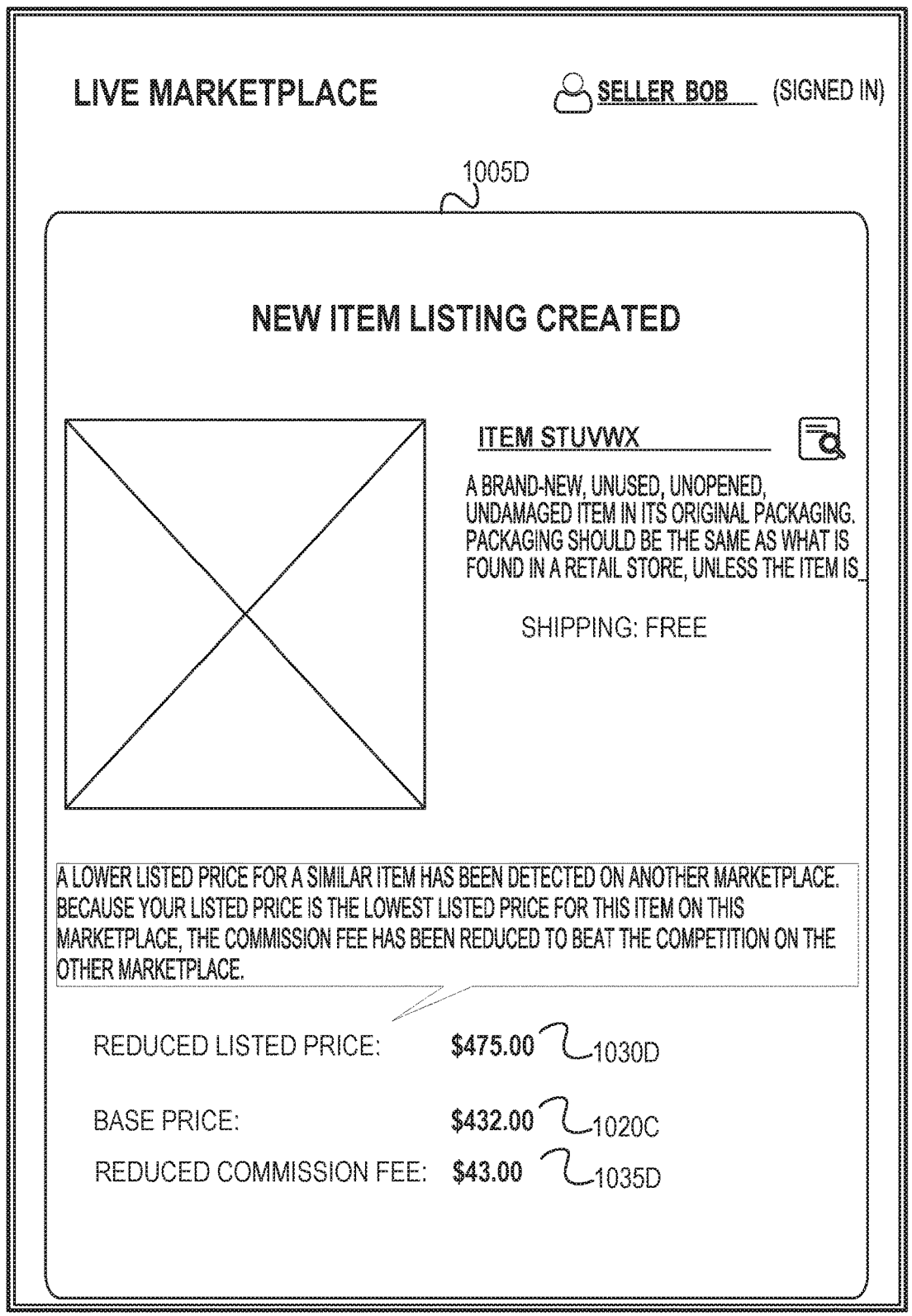

At operation 840, as described in reference to FIG. 10D, the commission fee adjustment system 150 (e.g., the adjustment module 205) causes display, on the user interface of the client device, of an updated first listed price for the first item listing. The updated first listed price may in particular be equal to the first listed price reduced by the commission fee reduction value computed at operation 825.

Figure 8B:
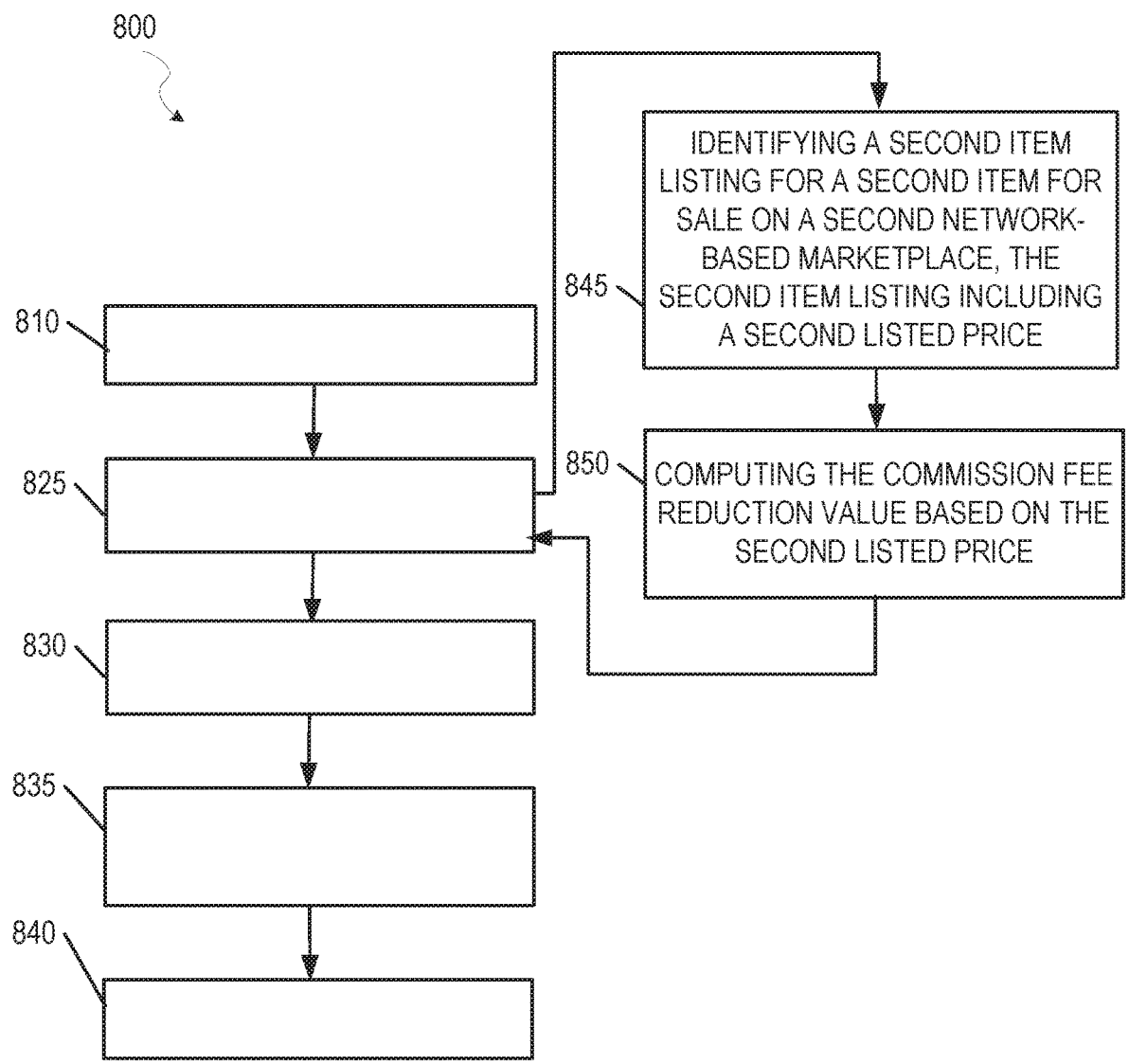

As shown in FIG. 8B, the method 800 may, in some embodiments, further include operations 845, and 850. Consistent with some embodiments, operation 845, and 850 may be performed as part of (e.g., as sub-operations or as a subroutine) operation 825, where the commission fee adjustment system 150 computes a commission fee reduction value for the first item listing. Consistent with some embodiments, operations 845, and 850 may be performed in part or in whole by an adjustment module 205 of a commission fee adjustment system 150.

At operation 845, the commission fee adjustment system 150 identifies at least one second item listing for a second item for sale on a second network-based marketplace. The second item listing may be identified based on the second item being similar or identical to the first item. The second listing may be identified based at least on an item attribute of the second item matching an item attribute of the first item. The second item listing includes a second listed price.

Figure 8C:
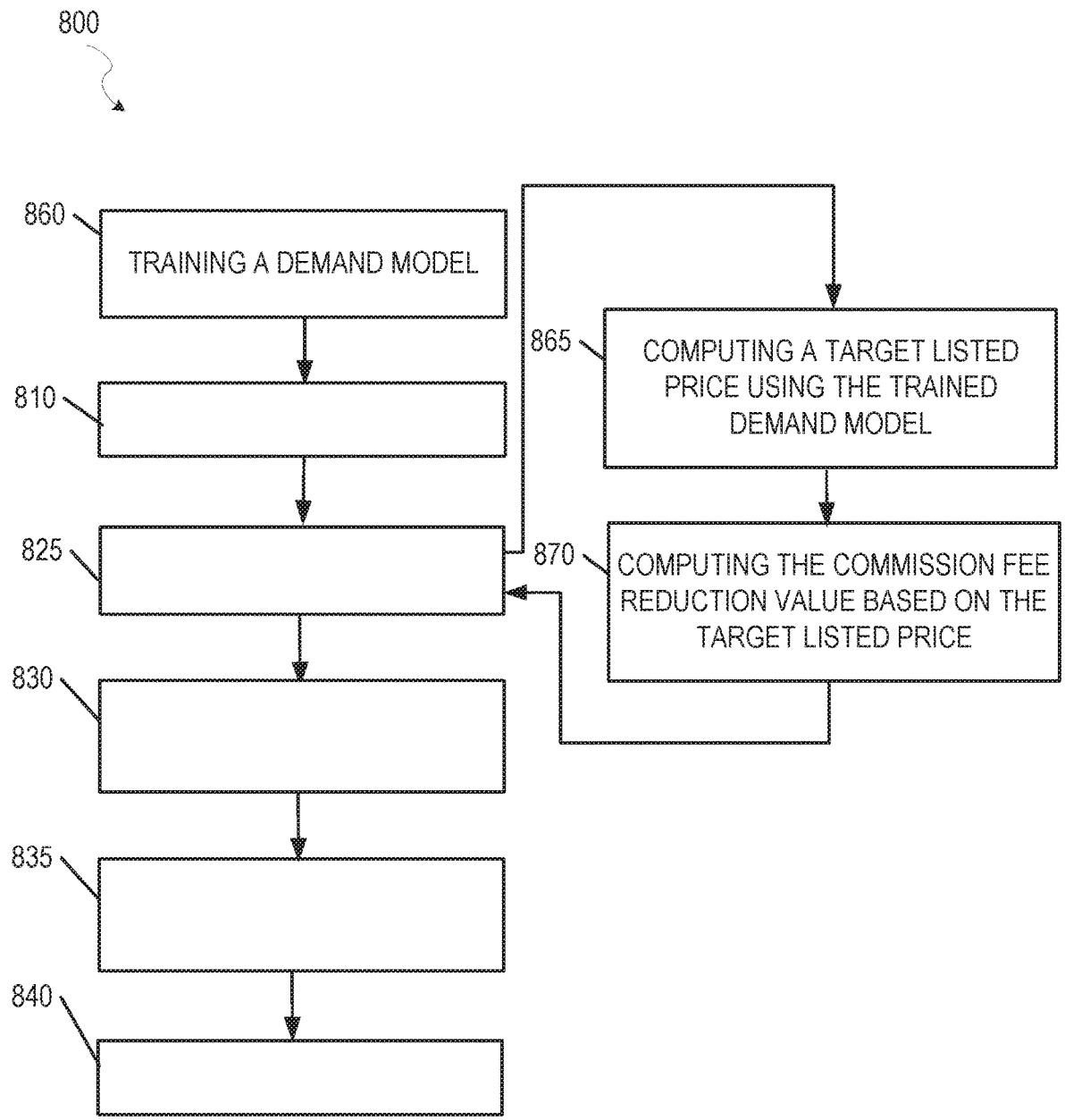

At operation 850, the commission fee adjustment system 150 computes the commission fee reduction value based on the second listed price. For example, if only one second item listing has been identified at operation 845, the commission fee reduction value can be the difference between the first listed price and the second listed price for the second item listing. If more than one second item listings have been identified at operation 845, the commission fee reduction value can be the difference between the first listed price and the lowest second listed price (i.e., the listed price of the second item listing having the lowest listed price). As shown in FIG. 8C, the method 800 may, in some embodiments, further include operations 860, 865 and 870. Consistent with some embodiments, operation 860 may be performed before operation 810, where the publication system 140 identifies a first item listing for a first item for sale at a first network-based marketplace. Consistent with some embodiments, operation 865 and 870 may be performed as part of (e.g., as sub-operations or as a subroutine) operation 825, where the commission fee adjustment system 150 computes a commission fee reduction value for the first item listing. Consistent with some embodiments, operation 860 may be performed in part or in whole by a training module 215 of a commission fee adjustment system 150. Consistent with some embodiments, operations 865, and 870 may be performed in part or in whole by an adjustment module 205 of a commission fee adjustment system 150.

At operation 860, the training module 215 trains a demand model. The demand model uses machine learning and/or statistical methods to generate demand forecasts for items for sale on the network-based marketplace. For example, the demand model can be trained to predict a probability to sell a given item at a given listed price. The model can be trained on a training set including historical data such as, context data, user behavior data (e.g., users implicit or explicit interest in item listings), offer prices received at the network-based marketplace, and/or listed prices of items listings published on another network-based market places.

At operation 865, the adjustment module 205 computes a target listed price for the first item listing using the demand model. The target listed can be computed as the listed price at which the probability to sell the first item trespasses a threshold. The demand model can compute the target listed price based on data such as, context data, user behavior data (e.g., users implicit or explicit interest in item listings), and/or offer prices received at the network-based marketplace, and/or listed prices of items listings published on another network-based market places (as described in reference to FIG. 8B).

At operation 870, the adjustment module 205 computes the commission fee reduction value based on the target listed price computed at operation 865. For example, the commission fee reduction value can be the difference between the first listed price and the target listed price.

Figure 9:
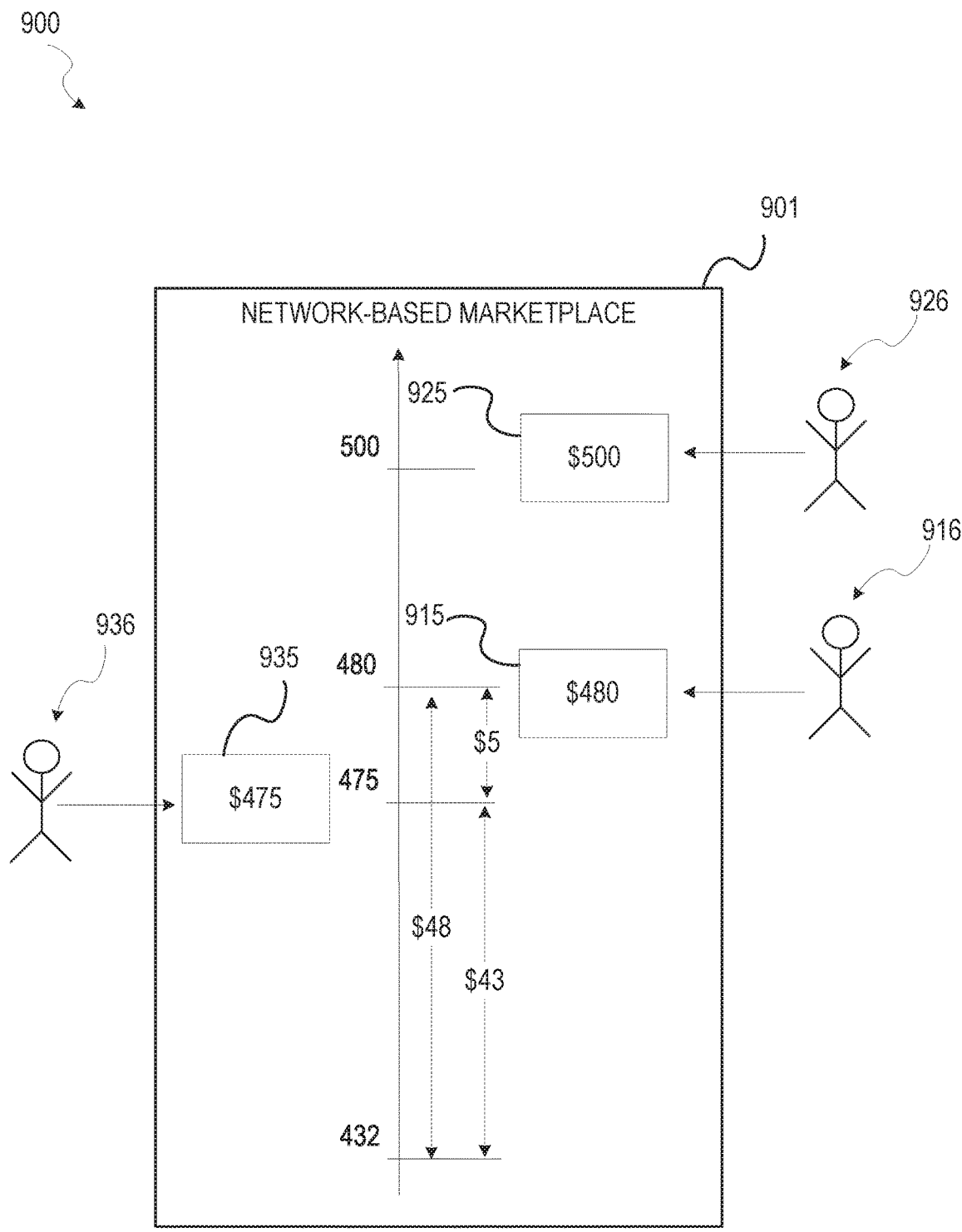
FIG. 9 is a conceptual diagram illustrating an example transaction process, according to some example embodiments.

FIG. 9 is a diagram 900 illustrating an example transaction processed according to some embodiments. In the illustrative example of FIG. 9, item listings 915 and 925 are published for identical or similar items on a network-based marketplace 901. The first item listing 915 associated with a first seller 916 includes a first listed price of $480. The first listed price is equal to a base price of $432 plus a standard commission fee of $48. The base price is the amount of money that the seller will receive if the transaction is completed. The second item listing 925 associated to a second seller 926 includes a listed price of $500. A purchase offer 935 is received from a buyer 936. The purchase offer includes an offer price of $475. Since the offer price is below both listed prices, a conventional network-based marketplace would be unable to complete a transaction for the sale of the item without further interactions with the buyer 936 and/or one of the sellers 916 or 926 to adjust the offer price and/or the listed price. According to some aspects of the present disclosure, a commission fee reduction value of $5 is computed based on a difference between the lowest listed price (i.e., the listed price of the first item listing) and the offer price. A reduced commission fee of $43 is determined as the standard commission fee of $48 reduced by the commission fee reduction value of $5, and a transaction for the sale of the item is automatically completed based on the reduced commission fee of $43. The transaction for the sale of the item is completed at an updated listed price of $475, the updated listed price been equal to the listed price of the first item listing reduced by the commission fee reduction value of $5.

FIG. 10A is an interface diagram illustrating an example interface 1000A presented on a client device of the potential buyer (e.g., user 106) as discussed in operation 305 of method 300. The interface 1000A includes a display of an item listing 1005 (e.g., first item listing 715). The item listing 1005 includes the listed price 1015, and optionally of one or more item attributes 1016. The interface 1000A may also include a display of other item listings 1020 for identical or similar items (e.g., second item listing 725). The interface 1000A may also include an editable input field 1030 for entering an offer price.

FIG. 10B is an interface diagram illustrating an example interface 1000B presented on a client device of the potential buyer (e.g., user 106) as discussed in operation 335 of the method 300 once the transaction for the sale of the first item has been completed. The interface 1000B includes the updated listed price 1035.

FIGS. 10A-10B illustrate some of the improvements provided by a user interface according to aspects of the present disclosure. The transaction for the sale of the first item has been completed, without requiring any user interaction from the seller and with minimal interaction from the buyer. More specifically, the buyer was able to complete the sale through a single user interaction (e.g., entering an offer price into the editable input field 1003), without navigating to other user interfaces, screens, or applications. For example, the buyer did not have to open a mailbox to see if his offer was accepted.

FIG. 10C is an interface diagram illustrating an example interface 1000C presented on a client device of a seller (e.g., user 106) as discussed in operation 810 of method 800. The interface 1000C includes a display of an item listing 1005C. The item listing 1005C includes a listed price 1015C, and optionally a base price 1020C and a standard commission fee 1025C.

FIG. 10D is an interface diagram illustrating an example interface 1000D presented on a client device of the seller (e.g., user 106) as discussed in operation 840 of method 800. The interface 1000D includes a display of an item listing 1005D. The item listing 1005D includes an updated listed price 1030D computed at operation 840, and optionally a reduced commission fee 1035D computed at operation 830. The base price 1020C is unchanged. While example interface 1000D illustrates an embodiment wherein the commission fee reduction value is computed based on a second listed price of an identical or similar item for sale on another network-based marketplace according to operation 850 described in reference to FIG. 8B, it shall be appreciated that a similar interface can be presented on a client device of the seller in embodiments wherein the commission fee reduction value is computed using a demand model according to operations 865 and 870 described in reference to FIG. 8C.

FIGS. 10C-10D illustrate some of the improvements provided by a user interface according to aspects of the present disclosure. The listed price has been reduced in order to be lower than listed prices of identical or similar items available on other network-based marketplaces without requiring any user interaction from the seller. More specifically, the listed price has been reduced, without requiring the seller to lower his base price.

The systems and methods described above are described in relation to items for sale on one or more network-based marketplaces (e.g., a first and a second network-based marketplace). However, it shall be appreciated that the system and methods described above may be deployed or applied to items for sale on any number of network-based marketplaces, by any number of retailers (e.g., a first and a second retailer), or on any number of network-based marketplaces and by any number of retailers.

Certain embodiments are described herein as including logic or a number of components, modules, or mechanisms. Modules may constitute either software modules code embodied on a non-transitory machine-readable medium) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware a combination of software and a programmable processor), or in a combination of permanently and temporarily configured hardware may be a design choice. Below are set out hardware (e.g., machine) and software architectures that may be deployed, in various example embodiments.

Hardware Architecture

Figure 11:
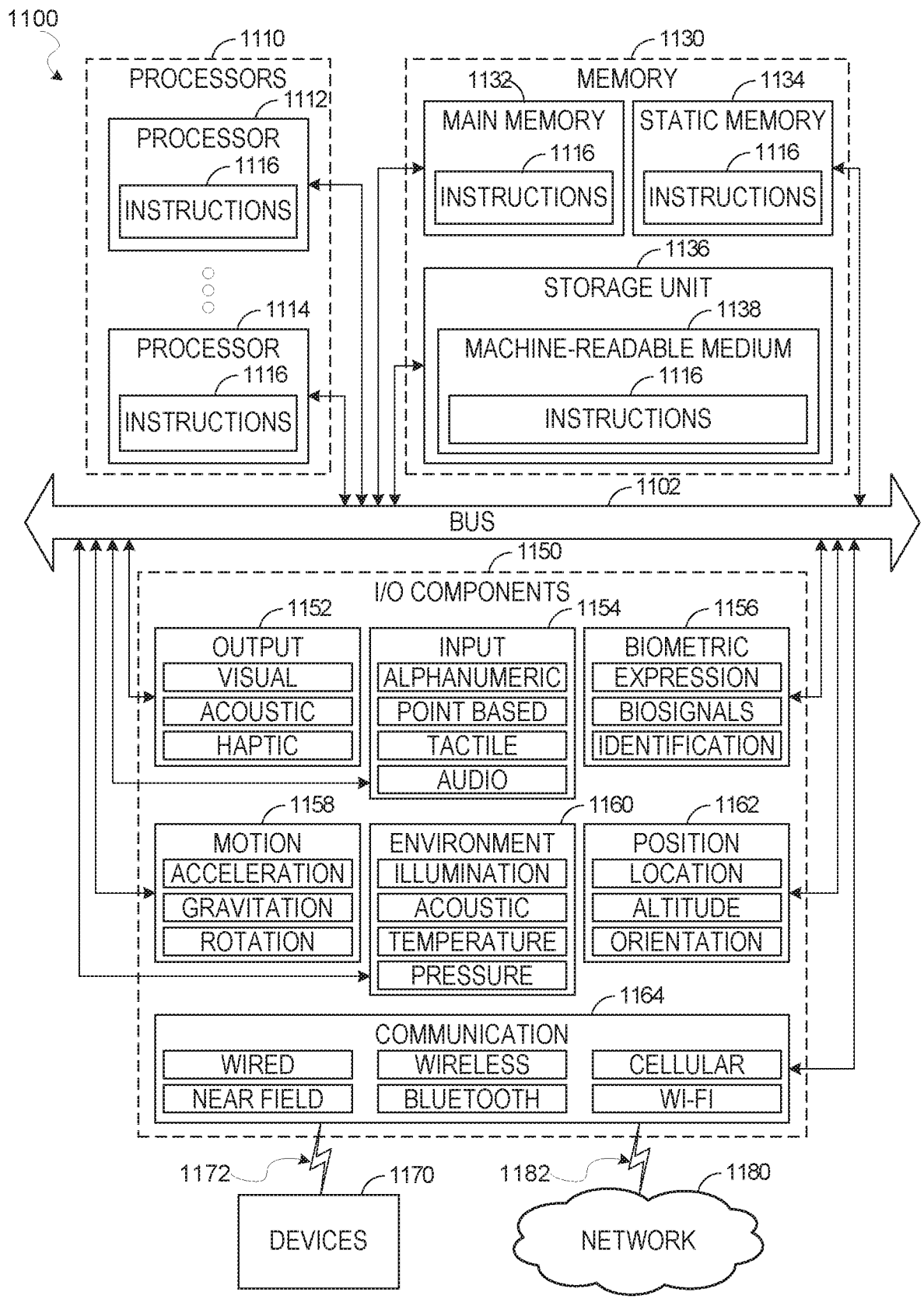
FIG. 11 shows a representative software architecture software architecture, which may be used in conjunction with various hardware architectures described herein.

FIG. 11 illustrates a diagrammatic representation of a machine 1100 in the form of a computer system within which a set of instructions may be executed for causing the machine to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute the methods of FIGS. 3-6. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 may include a main memory 1132, a static memory 1134, and a storage unit 1136, both accessible to the processors 1110 such as via the bus 1102. The main memory 1130, the static memory 1134, and storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1130, 1132, 1134, and/or memory of the processor(s) 1110) and/or storage unit 1136 may store one or more sets of instructions and data structures (e.g., software) embodying or utilized by any one or more of the methodologies or functions described herein. These instructions the instructions 1116), when executed by processor(s) 1110, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1180 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
one or more processors; and
a non-transitory memory storing instructions that configure the one or more processors to perform operations comprising:
identifying a set of rules by training a machine learning model, the training of the machine learning model resulting in a maximization of a performance indicator of a network-based marketplace;
receiving a purchase offer for an item for sale via a user interface displayed on a client device, the purchase offer including an offer price;
identifying a listed price for the item for sale;
based on determining the offer price is below the listed price, computing a commission fee reduction value based on a difference between the listed price and the offer price;

determining a reduced commission fee based on the commission fee reduction value and a standard commission fee; and based on determining that the reduced commission fee satisfies a condition defined by the set of rules and in response to a user of the client device submitting the purchase offer via the user interface, automatically completing a transaction for the sale of the item based on the reduced commission fee, the completing of the transaction comprising reducing the listed price by the commission fee reduction value without any user interaction from the seller of the item with the network-based marketplace to reduce the listed price for the item.

2. The system of claim 1, wherein the user interface comprises an editable input field for entering the offer price.

3. The system of claim 2, wherein the operations further comprise:

based on determining that the reduced commission fee verifies the condition defined by the set of rules, causing display, within the user interface of the client device, of an updated listed price, the updated listed price being based on the listed price and on the commission fee reduction value.

4. The system of claim 3, wherein the updated listed price is equal to the listed price reduced by the commission fee reduction value.

5. The system of claim 1, wherein the condition defined by the set of rules comprises that the reduced commission fee surpasses a threshold commission fee.

6. The system of claim 5, wherein the threshold commission fee is computed based on user profile data of a user associated with the client device.

7. The system of claim 1, wherein:

the listed price is a first listed price;

the item is a first item for sale on a first network-based marketplace;

the operations further comprise:

identifying a second item for sale on a second network-based marketplace, the second item being identified based at least on an item attribute of the second item matching an item attribute of the first item, the second item for sale being associated with a second listed price; and wherein the threshold commission fee is computed further based on a difference between the second listed price and the first listed price.

8. The system of claim 1, wherein the model is trained on a training set including historical data regarding listed prices, offer prices, and historical performances of the network-based marketplace.

9. The system of claim 1, wherein identifying a listed price for the item for sale comprises:

identifying a plurality of item listing for the item for sale; and identifying the item listing having a lowest listed price among the plurality of item listings for the item for sale, the listed price being the lowest listed price.

10. The system of claim 1, wherein the determining the reduced commission fee comprises subtracting the commission fee reduction value from the standard commission fee.

11. A method comprising:

identifying, by a server machine comprising one or more processors, a set of rules by training a machine learning model, the training of the machine learning model resulting in a maximization of a performance indicator of a network-based marketplace;

receiving, by the server machine, a purchase offer for an item for sale via a user interface displayed on a client device, the purchase offer including an offer price;

identifying a listed price for the item for sale;

based on determining the offer price is below the listed price, computing, by the server machine, a commission fee reduction value based on a difference between the listed price and the offer price;

determining, by the server machine, a reduced commission fee based on the commission fee reduction value and a standard commission fee; and based on determining that the reduced commission fee satisfies a condition defined by the set of rules and in response to a user of the client device submitting the purchase offer via the user interface, automatically completing, by the server machine, a transaction for the sale of the item based on the reduced commission fee, the completing of the transaction comprising reducing the listed price by the commission fee reduction value without any user interaction from the seller of the item with the network-based marketplace to reduce the listed price for the item.

12. The method of claim 11, wherein the user interface comprises an editable input field for entering the offer price.

13. The method of claim 12, further comprising:

based on determining that the reduced commission fee verifies the condition defined by the set of rules, causing display, within the user interface of the client device, of an updated listed price, the updated listed price being based on the listed price and on the commission fee reduction value.

14. The method of claim 13, wherein the updated listed price is equal to the listed price reduced by the commission fee reduction value.

15. The method of claim 11, wherein the condition defined by the set of rules comprises that the reduced commission fee surpasses a threshold commission fee.

16. The method of claim 15, wherein the threshold commission fee is computed based on user profile data of a user associated with the client device.

17. The method of claim 11, wherein:

the listed price is a first listed price;

the item is a first item for sale on a first network-based marketplace;

the method further comprises:

identifying a second item for sale on a second network-based marketplace, the second item being identified based at least on an item attribute of the second item matching an item attribute of the first item, the second item for sale being associated with a second listed price; and wherein the threshold commission fee is computed further based on a difference between the second listed price and the first listed price.

18. A non-transitory machine-readable storage medium including instructions that, when executed by a machine, cause the machine to perform operations comprising:

identifying a set of rules by training a machine learning model, the training of the machine learning model resulting in a maximization of a performance indicator of a network-based marketplace;

receiving a purchase offer for an item for sale via a user interface displayed on a client device, the purchase offer including an offer price;

identifying a listed price for the item for sale;
based on determining the offer price is below the listed price, computing a commission fee reduction value based on a difference between the listed price and the offer price;
determining a reduced commission fee based on the commission fee reduction value and a standard commission fee; and
based on determining that the reduced commission fee satisfies a condition defined by the set of rules and in response to a user of the client device submitting the purchase offer via the user interface, automatically completing a transaction for the sale of the item based on the reduced commission fee, the completing of the transaction comprising reducing the listed price by the commission fee reduction value without any user interaction from the seller of the item with the network-based marketplace to reduce the listed price for the item.

\* \* \* \* \*